(12) United States Patent
Grilliot et al.

(10) Patent No.: US 6,806,215 B2
(45) Date of Patent: Oct. 19, 2004

(54) COMPOSITE STRUCTURE FOR PROTECTIVE GARMENT

(75) Inventors: William L. Grilliot, Dayton, OH (US); Mary I. Grilliot, Dayton, OH (US)

(73) Assignee: Morning Pride Manufacturing, L.L.C., Dayton, OH (US)

(*) Notice: Subject to any disclaimer, the term of this patent is extended or adjusted under 35 U.S.C. 154(b) by 138 days.

(21) Appl. No.: 10/151,387

(22) Filed: May 20, 2002

(65) Prior Publication Data

US 2002/0137412 A1 Sep. 26, 2002

Related U.S. Application Data

(63) Continuation-in-part of application No. 09/659,957, filed on Sep. 12, 2000, now Pat. No. 6,658,670.

(51) Int. Cl.[7] ............... B32B 27/04; B32B 27/12; B32B 5/26

(52) U.S. Cl. ............... 442/268; 442/76; 442/283; 442/285; 442/381; 442/394; 442/414; 442/417; 428/920

(58) Field of Search ............... 428/92, 920; 442/76, 442/268, 319, 327, 381, 394

(56) References Cited

U.S. PATENT DOCUMENTS

| | | | |
|---|---|---|---|
| 4,999,850 A | * | 3/1991 | Grilliot et al. ............ 2/126 |
| 5,630,230 A | | 5/1997 | Fujino et al. ............ 2/200.1 |
| 5,817,365 A | | 10/1998 | Richardson et al. ............ 427/7 |
| 5,885,912 A | | 3/1999 | Bumbarger ............ 442/239 |
| 5,887,276 A | | 3/1999 | Lee ............ 2/7 |
| 5,956,759 A | | 9/1999 | Benedict ............ 2/7 |
| 6,317,889 B1 | | 11/2001 | Reilly et al. ............ 2/24 |
| 6,371,977 B1 | * | 4/2002 | Bumbarger et al. ............ 607/108 |

* cited by examiner

*Primary Examiner*—Cheryl A. Juska
*Assistant Examiner*—Jenna-Leigh Befumo
(74) *Attorney, Agent, or Firm*—Wood, Philips, Katz, Clark & Mortimer

(57) ABSTRACT

A composite structure for a protective garment, such as a protective garment for a firefighter, has a moisture absorber, a moisture barrier and an outer shell. The moisture barrier is disposed outwardly in relation to the moisture absorber, while the outer shell is disposed outwardly in relation to the moisture barrier. The moisture absorber has a fibrous matrix incorporating a superabsorbent polymer, as particles or as fibers, and is disposed between an inner cover pervious to moisture and an outer cover. The inner and outer covers may be quilted so as to segregate discrete regions of the fibrous matrix.

10 Claims, 1 Drawing Sheet

COMPOSITE STRUCTURE FOR PROTECTIVE GARMENT

CROSS-REFERENCE TO RELATED APPLICATION

This application is a continuation-in-part of U.S. patent application Ser. No. 09/659,957, which was filed on Sep. 12, 2000, and has been allowed as U.S. Pat. No. 6,658,670, and the disclosure of which is incorporated herein by reference.

TECHNICAL FIELD OF THE INVENTION

This invention pertains to a composite structure for a protective garment, such as a pair of bunker pants for a firefighter, a bunker coat for a firefighter, or a glove for a firefighter. This invention contemplates that the composite structure incorporates a superabsorbent polymer.

BACKGROUND OF THE INVENTION

Commonly, in a firefighting environment, a firefighter wearing protective garments, such as bunker pants, a bunker coat, and gloves, sweats copiously within such garments, whereby the firefighter is exposed to severe stresses due to sweating, as well as to severe stresses due to firefighting. Such stresses are known to contribute significantly to fatigue, injuries, and fatalities among firefighters.

This invention addresses an ascertained need for a composite structure, from which such garments could be made and which would employ a superabsorbent polymer to absorb copious amounts of human sweat, whereby to reduce such stresses due to sweating.

Usage of a superabsorbent polymer in a composite structure for a protective garment, such as a protective garment for a firefighter, is disclosed in U.S. Pat. No. 5,885,912 to Bumberger, the disclosure of which is incorporated herein by reference.

SUMMARY OF THE INVENTION

This invention provides a composite structure for a protective garment, such as a pair of bunker pants for a firefighter, a bunker coat for a firefighter, or a glove for a firefighter. The composite structure has a moisture absorber, a moisture barrier disposed outwardly in relation to the moisture absorber, and an outer shell disposed outwardly in relation to the moisture barrier. The moisture absorber incorporates a superabsorbent polymer.

Preferably, the moisture absorber has a fibrous matrix incorporating the superabsorbent polymer, as particles or as fibers. Preferably, the fibrous matrix is disposed between an inner cover, which is moisture-pervious, and an outer cover, which is moisture-pervious or moisture-impervious. Preferably, the inner and outer covers, between which the fibrous matrix is disposed, is quilted so as to segregate discrete regions of the fibrous matrix.

In one contemplated embodiment, the moisture barrier is affixed to the outer shell so as to have surface-to-surface adhesion between an outer surface of the moisture barrier and an inner surface of the outer shell. Thus, the moisture barrier may be a moisture-impervious layer, e.g. a neoprene layer, which is laminated to the inner surface of the outer shell, or a moisture-impervious layer, e.g. a Breathe Tex™ layer, which is coated on the inner surface of the outer shell. In an alternative embodiment, the moisture barrier is affixed to the outer cover of the moisture absorber so as to have surface-to-surface adhesion between an inner surface of the moisture barrier and an outer surface of the outer cover of the moisture absorber.

In alternative embodiments, a thermally insulative layer is interposed between the moisture absorber and the moisture barrier. The thermally insulative layer may have a conventional construction so as to comprise an inner cover, an outer cover, and a filler, which is interposed between the inner and outer covers. The inner and outer covers may be quilted so as to segregate discrete portions of the filler.

In one contemplated embodiment employing the thermally insulative layer, the moisture barrier is affixed to the outer shell so as to have surface-to-surface adhesion between an outer surface of the moisture barrier and an inner surface of the outer shell. In an alternative embodiment employing the thermally insulative layer, the moisture barrier is affixed to the thermally insulative layer so as to have surface-to-surface adhesion between an outer surface of the thermally insulative layer and an inner surface of the moisture barrier. In the latter embodiment employing the thermally insulative layer, if the thermally insulative layer has the conventional construction noted above, the moisture barrier may be so affixed to the outer cover of the thermally insulative layer.

Hereinbefore and hereinafter, moisture refers to any predominantly aqueous liquid, particularly but not exclusively water or human sweat. Hereinbefore and hereinafter, terms such as inner, outer, inwardly, and outwardly are employed from a standpoint of a wearer of a protective garment.

DETAILED DESCRIPTION OF THE ILLUSTRATED EMBODIMENTS

Figure 1:
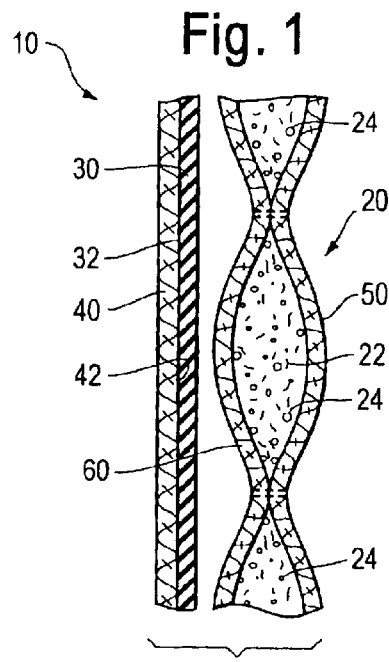
FIGS. 1, 2, 3, and 4, respectively, are fragmentary, cross-sectional views of composite structures, each constituting one contemplated embodiment of this invention. In the respective embodiments shown in FIGS. 1, 2, 3, and 4, similar elements are designated by similar numbers.

As shown in FIG. 1, a composite structure 10 for a protective garment, such as a pair of bunker pants for a firefighter, a bunker coat for a firefighter, or a glove for a firefighter, is made from fire-resistant materials and has a moisture absorber 20, a moisture barrier 30 disposed outwardly in relation to the moisture absorber 20, and an outer shell 40 disposed outwardly in relation to the moisture barrier 30. As explained below, the moisture absorber 20 incorporates a superabsorbent polymer, which may be a cross-linked polyacrylamide and which can absorb copious amounts of human sweat.

In the embodiment shown in FIG. 1, the moisture barrier 30 is affixed to the outer shell 40 so as to have surface-to-surface adhesion between an outer surface 32 of the moisture barrier 30 and an inner surface 42 of the outer shell 40. Thus, the moisture barrier 30 may be a moisture-impervious layer, e.g. a neoprene layer, which is laminated to the inner surface 42 of the outer shell 40, or a moisture-impervious layer, e.g. a Breathe Tex™ layer, which is coated on the inner surface 42 of the outer shell 40.

As shown in FIG. 1, the moisture absorber 20 has a fibrous matrix 22 incorporating particles 24 of the superabsorbent polymer. Alternatively, the fibrous matrix 22 incorporates fibers of the superabsorbent polymer. The fibrous matrix 22 is disposed between an inner cover 50, which is moisture-pervious, and an outer cover 60, which is moisture-pervious. The covers 50, 60, between which the fibrous matrix 22 is disposed, are textile layers, which are quilted to segregate discrete regions of the fibrous matrix 22.

Examples of superabsorbent polymers and processes for their incorporation into fibrous matrices are disclosed in prior patents including U.S. Pat. No. 3,670,731 to Harmon, U.S. Pat. No. 4,105,033 to Chaterjee et al, U.S. Pat. No. 4,235,237 to Mesek et al., U.S. Pat. No. 4,429,001 to Kolpin et al., U.S. Pat. No. 4,985,298 to Buckley et al., U.S. Pat. No. 5,087,513 to Kim, U.S. Pat. No. 5,328,759 to McCormack et al., and U.S. Pat. No. 5,419,955 to Ehrhardt et al., the disclosures of which are incorporated herein by reference.

Figure 2:
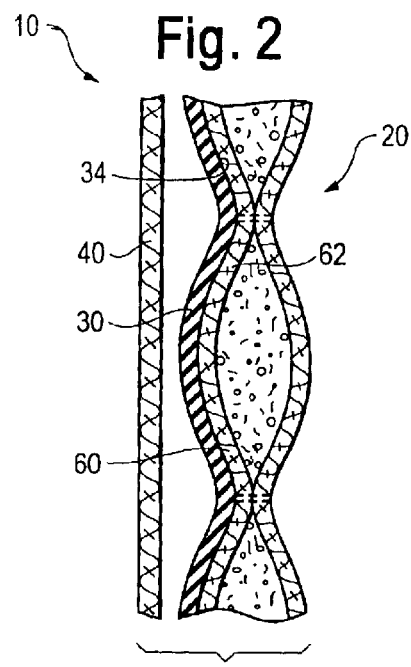

In the embodiment shown in FIG. 2, the moisture barrier 30 is not affixed to the outer shell 40 so as to have surface-to-surface adhesion, as described above. Rather, the moisture barrier 20 is affixed to the outer cover 60 of the moisture absorber 20 so as to have surface-to-surface adhesion between an inner surface 34 of the moisture barrier 30 and an outer surface 62 of the outer cover 60 of the moisture absorber 20. Thus, the moisture barrier 30 may be a moisture-impervious layer, e.g. a neoprene layer, which is laminated to the outer surface 62 of the outer cover 60 of the moisture absorber 20, or a moisture-impervious layer, e.g. a Breathe Tex™ layer, which is coated on the outer cover 60 of the moisture absorber 20.

Figure 3:
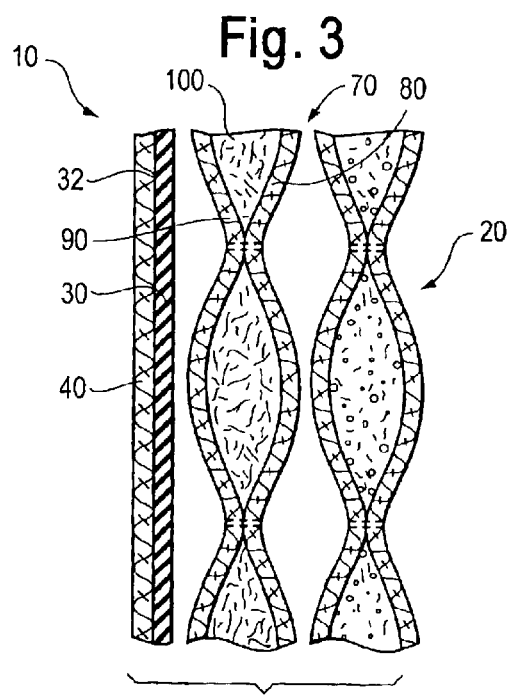
Figure 4:
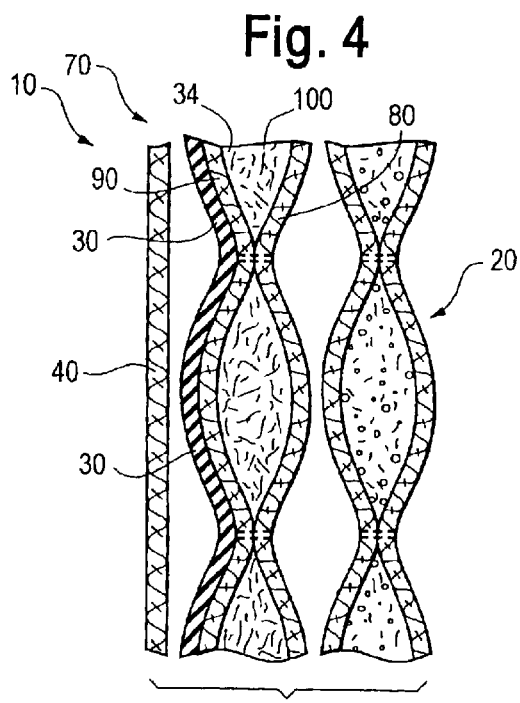

In each of the embodiments shown in FIGS. 3 and 4, a thermally insulative layer 70 is interposed between the moisture absorber 20 and the moisture barrier 30. The thermally insulative layer 70 has a conventional construction so as to comprise an inner cover 80, an outer cover 90, and a filler 100, which is thermally insulative and which is disposed between the covers 80, 90. The covers 80, 90, are quilted so as to segregate discrete regions of the filler 100.

In the embodiment shown in FIG. 3, the moisture barrier 30 is affixed to the outer shell 40, as in the embodiment shown in FIG. 1 and described above. In the embodiment shown in FIG. 4, the moisture barrier 40 is affixed to the outer cover 90 so as to have surface-to-surface adhesion between an outer surface of the outer cover 90 and the inner surface 34 of the moisture barrier 30.

In each of the embodiments shown and described, the superabsorbent polymer can absorb copious amounts of human sweat, whereby to reduce sweat-caused stresses on a firefighter wearing a protective garment made from the composite material. Desirably, in each of the embodiments shown and described, a protective garment comprising the composite structure is made so that the composite structure can be easily removed for drying, or for laundering and drying, and so that the removed structure can be easily replaced.

What is claimed is:

1. For a protective garment, a composite structure having a moisture absorber, a moisture barrier disposed outwardly in relation to the moisture absorber, a thermally insulative layer interposed between the moisture absorber and the moisture barrier, and an outer shell disposed outwardly in relation to the moisture barrier, wherein the moisture absorber has a fibrous matrix, which incorporates a superabsorbent polymer and which is disposed between an inner cover pervious to moisture and an outer cover.

2. The composite structure of claim 1 wherein the fibrous matrix incorporates particles of the superabsorbent polymer.

3. The composite structure of claim 1 wherein the fibrous matrix incorporates fibers of the superabsorbent polymer.

4. The composite structure of claim 1 wherein the inner and outer covers, between which the fibrous matrix is disposed, is quilted so as to segregate discrete regions of the fibrous matrix.

5. The composite structure of claim 2 wherein the inner and outer covers, between which the fibrous matrix is disposed, is quilted so as to segregate discrete regions of the fibrous matrix.

6. The composite structure of claim 3 wherein the inner and outer covers, between which the fibrous matrix is disposed, is quilted so as to segregate discrete regions of the fibrous matrix.

7. The composite structure of claim 1, 2, 3, 4, 5, or 6 wherein the moisture barrier is affixed to the outer shell so as to have surface-to-surface adhesion between an outer surface of the moisture barrier and an inner surface of the outer shell.

8. The composite structure of claim 1, 2, 3, 4, 5, or 6 wherein the moisture barrier is affixed to the thermally insulative layer so as to have surface-to-surface adhesion between an outer surface of the thermally insulative layer and an inner surface of the moisture barrier.

9. The composite structure of claim 1, 2, 3, 4, 5, or 6 wherein the thermally insulative layer comprises an inner cover, an outer cover, and a filler between the inner and outer covers of the thermally insulative layer.

10. The composite layer of claim 9 wherein the moisture barrier is affixed to the outer cover of the thermally insulative layer so as to have surface-to-surface adhesion between an outer surface of the outer cover of the thermally insulative layer and an inner surface of the moisture barrier.

* * * * *